US010975825B2

(12) United States Patent
Awadi et al.

(10) Patent No.: US 10,975,825 B2
(45) Date of Patent: Apr. 13, 2021

(54) METHODS AND SYSTEM FOR INHIBITING AUTOMATIC ENGINE STOPPING

(71) Applicant: Ford Global Technologies, LLC, Dearborn, MI (US)

(72) Inventors: Ahmed Awadi, Farmington Hills, MI (US); Hafiz Khafagy, Dearborn, MI (US); Hussam Makkiya, Dearborn, MI (US); Abraham Mezaael, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 147 days.

(21) Appl. No.: 16/256,958

(22) Filed: Jan. 24, 2019

(65) Prior Publication Data
US 2020/0240381 A1  Jul. 30, 2020

(51) Int. Cl.
*F02N 11/08* (2006.01)
*F02D 41/06* (2006.01)
*F02D 41/04* (2006.01)

(52) U.S. Cl.
CPC ...... *F02N 11/0822* (2013.01); *F02N 11/0825* (2013.01); *F02D 41/042* (2013.01); *F02D 41/062* (2013.01); *F02D 2200/501* (2013.01); *F02D 2200/503* (2013.01); *F02D 2200/602* (2013.01); *F02N 2200/061* (2013.01); *F02N 2200/0801* (2013.01); *F02N 2200/102* (2013.01)

(58) Field of Classification Search
CPC ............ F02N 11/0822; F02N 11/0825; F02N 2200/102; F02N 2200/061; F02N 2200/0801; F02D 41/062; F02D 41/042; F02D 2200/503; F02D 2200/602; F02D 2200/501
See application file for complete search history.

(56) References Cited

U.S. PATENT DOCUMENTS

| | | | | |
|---|---|---|---|---|
| 9,163,602 B2* | 10/2015 | Killy | ................. | B60W 10/06 |
| 9,731,698 B1* | 8/2017 | Khafagy | ................. | F02N 11/08 |
| 2011/0238284 A1* | 9/2011 | Bollig | ............... | B60W 30/192 |
| | | | | 701/113 |
| 2012/0077640 A1* | 3/2012 | Saito | ................. | F02D 17/02 |
| | | | | 477/183 |
| 2012/0080001 A1* | 4/2012 | Saito | ................. | F02N 11/0822 |
| | | | | 123/179.4 |
| 2014/0066256 A1 | 3/2014 | Yu et al. | | |
| 2015/0148192 A1* | 5/2015 | Lyon | ................. | F02N 11/0822 |
| | | | | 477/203 |
| 2016/0290264 A1* | 10/2016 | Oda | ................. | F02N 11/0818 |
| 2018/0003143 A1* | 1/2018 | Khafagy | ................. | B60L 1/00 |
| 2018/0043878 A1 | 2/2018 | Khafagy et al. | | |
| 2019/0217847 A1* | 7/2019 | Hawley | ............ | B60W 50/0098 |

* cited by examiner

*Primary Examiner* — Joseph J Dallo
*Assistant Examiner* — Kurt Philip Liethen
(74) *Attorney, Agent, or Firm* — Geoffrey Brumbaugh; McCoy Russell LLP (57) ABSTRACT

Systems and methods for operating a vehicle that includes an engine that may be automatically stopped and started are described. In one example, the inhibiting or preventing automatic engine stopping may be performed when a human driver releases a brake pedal, which causes the engine to automatically start, and the inhibiting may continue until vehicle speed exceeds a speed where the engine was automatically stopped.

20 Claims, 7 Drawing Sheets

METHODS AND SYSTEM FOR INHIBITING AUTOMATIC ENGINE STOPPING

FIELD

The present description relates to methods and a system for a vehicle that includes an engine that may be automatically stopped and started.

BACKGROUND AND SUMMARY

A vehicle may include an engine that is stopped and restarted automatically to conserve fuel. The engine may be automatically stopped when the vehicle comes to a full stop. The engine may also be stopped when the vehicle is moving and driver demand torque is low. For example, the engine may be stopped when the accelerator pedal is released and when the brake pedal is applied so that the amount of time that the engine is stopped may be increased. By increasing the amount of time that the engine is stopped, additional fuel may be conserved.

The engine may be stopped at a higher vehicle speed due to a low driver demand torque, but the brake may be released and the driver demand torque may be increased shortly after the engine is stopped based on the vehicle driver's actions. Some human drivers may tend to apply and release the brake pedal several times while the vehicle is decelerating. This may cause the engine to stop and start repeatedly so that fuel conservation may be reduced. In addition, the repeated engine stopping and starting may irritate the vehicle's occupants. Accordingly, it may be desirable to provide a way of automatically stopping an engine that preserves at least some of the fuel economy benefits of automatic engine stopping without having to subject human occupants of the vehicle to repeated engine stopping and starting events that they may find objectionable.

The inventors herein have recognized the above-mentioned issues and have developed an engine operating method, comprising: inhibiting automatic engine stopping of an engine via a controller in response to releasing a brake pedal while vehicle speed is less than a rolling vehicle speed automatic engine stop threshold and above a steady-state vehicle speed automatic engine stop threshold after a most recent automatic engine stop at a vehicle speed between the rolling vehicle speed automatic engine stop threshold and the steady-state vehicle speed automatic engine stop threshold.

By inhibiting automatic engine stopping in response to releasing a brake pedal while a vehicle speed is less than a first speed and greater than a second speed, it may be possible to provide the technical result of reducing a frequency of automatic engine stops and starts to reduce a possibility of disturbing vehicle occupants. Further, since the engine is allowed to continue automatic engine stopping and starting when select conditions are met, the vehicle may still provide a desirable level of fuel economy.

The present description may provide several advantages. In particular, the approach may reduce the possibility of disturbing vehicle occupants. Further, the approach may provide a desirable level of fuel economy. In addition, the approach may inhibit automatic engine stopping and starting with a dynamic vehicle speed threshold so that automatic engine stopping and starting adjusts to a driver's driving style, thereby reducing the possibility of disturbing the driver.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 7:
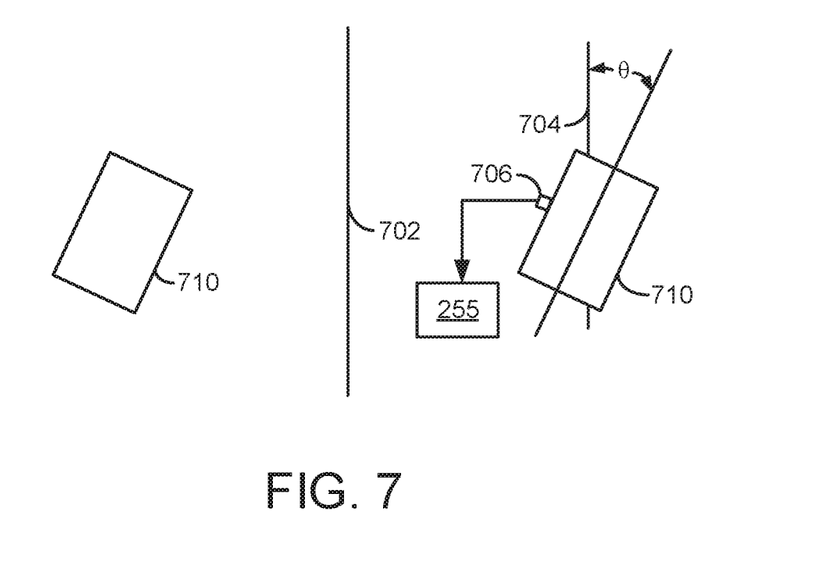
FIG. 7 shows a schematic view of a steering angle.
Figure 8:
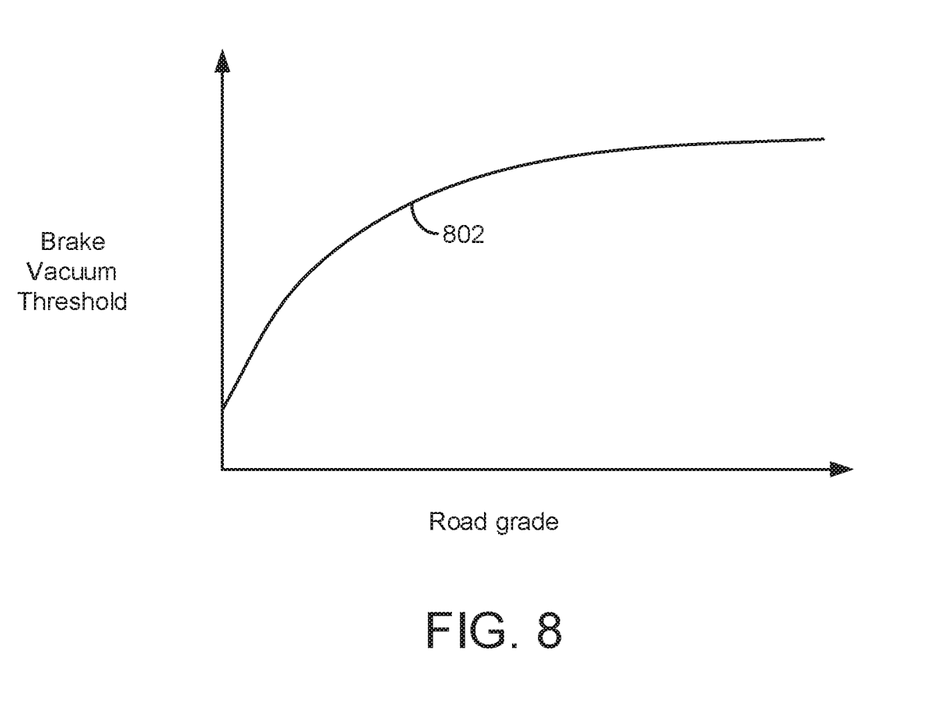
FIG. 8 shows an example brake vacuum threshold versus road grade.

The present description is related to operating a vehicle that includes an engine that may be automatically stopped (e.g., the engine may be stopped in response to vehicle operating conditions via a controller without a human or autonomous driver specifically requesting an engine stop via a dedicated input that has sole function(s) for stopping and starting the engine, such as a pushbutton or key switch) and automatically started (e.g., the engine may be started in response to vehicle operating conditions via a controller without a human or autonomous driver specifically requesting an engine start via a dedicated input that has sole function(s) for stopping and starting the engine, such as a pushbutton or key switch). The approach may dynamically adjust engine stopping conditions so that occupants may experience a level of automatic engine stops and starts that may be closer to their expectations or desires. The vehicle may include an engine of the type shown in FIG. 1. The engine may be included in a driveline as shown in FIG. 2. The vehicle may operate according to the sequence of FIG. 3. The vehicle may be operated according to the method of FIGS. 4-6 to improve selection of automatic engine stopping and starting conditions. The method of FIGS. 4-6 may adjust automatic engine stopping conditions responsive to a steering angle as shown in FIG. 7. The method may adjust automatic engine stopping conditions responsive to road grade via a vacuum threshold as shown in FIG. 8.

Figure 1:
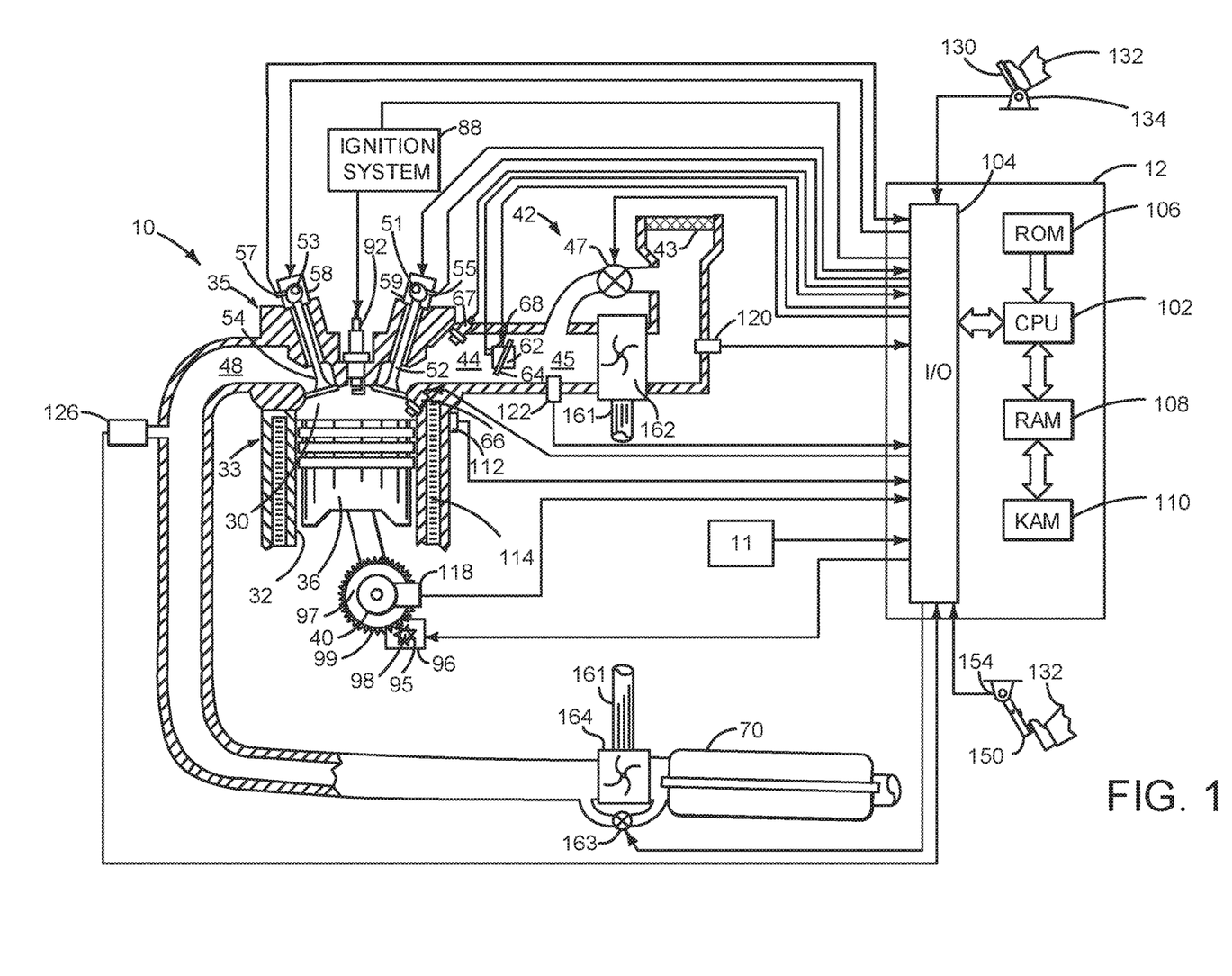
FIG. 1 is a schematic diagram of an engine.
Figure 2:
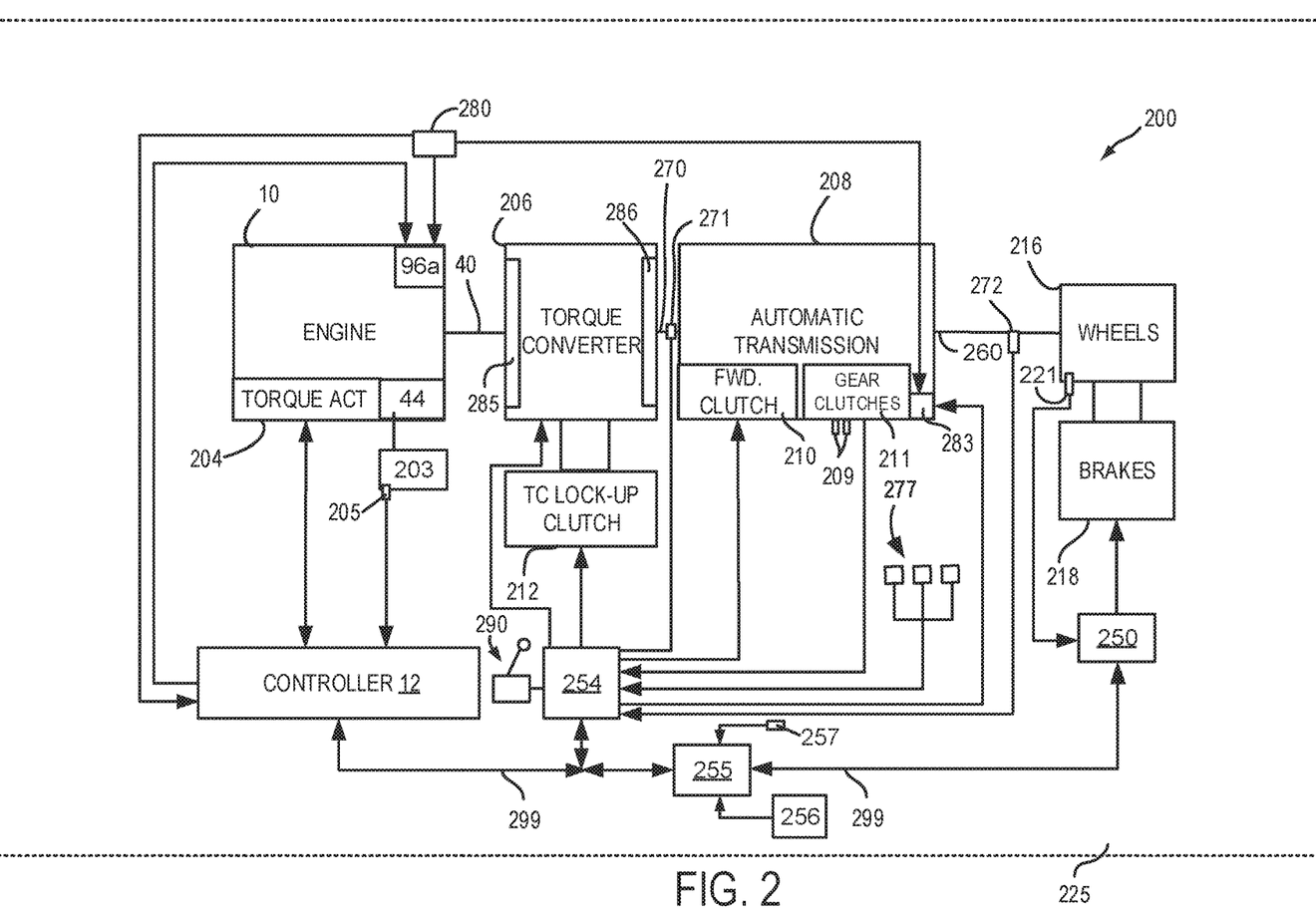
FIG. 2 is a schematic diagram of a vehicle driveline.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2 and employs the actuators shown in FIGS. 1 and 2 to adjust engine and driveline operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 via solenoid 93 to engage ring gear 99. Starter 96 may be directly mounted to the front of the engine or the rear of the engine. In some examples, starter 96 may selectively supply power to crankshaft 40 via a belt or chain. In one example, starter 96 is in a base state when not engaged to the engine crankshaft 40 and flywheel ring gear 99.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, transmission controller 254, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, transmission controller 254, and brake controller 250 to achieve driver input requests and other requests that are based on vehicle operating conditions. In some examples, controller 255 may operate as an autonomous driver, thereby generating engine torque requests, transmission gear shifts, and vehicle braking demands or requests.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from engine controller 12, thereby providing a desired driveline braking power at vehicle wheels 216. Vehicle system controller 255 may also request a friction braking power via brake controller 250. The braking powers may be referred to as negative powers since they may slow driveline and wheel rotation. Positive power may maintain or accelerate driveline and wheel rotation.

In other examples, the partitioning of controlling powertrain devices may be partitioned differently than is shown in FIG. 2. For example, a single controller may take the place of vehicle system controller 255, engine controller 12, transmission controller 254, and brake controller 250. Alternatively, the vehicle system controller 255 and the engine controller 12 may be a single unit while the transmission controller 254 and the brake controller 250 are standalone controllers.

In this example, powertrain 200 may be powered by engine 10. Engine 10 may be started with an engine starting system shown in FIG. 1. Further, power of engine 10 may be adjusted via power or torque actuator 204, such as a fuel injector, throttle, etc. Engine 10 may supply vacuum to vacuum reservoir (e.g., a brake booster) 203. A vacuum level may be sensed via vacuum sensor 205. Low voltage battery 280 selectively supplies electrical energy to starter motor 96a. Starter motor 96a may rotate pinion gear 95. Engine 10 supplies torque to torque converter 206 via crankshaft 40. Torque converter 206 includes a turbine 286 to output power to transmission input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits power from engine crankshaft 40 to automatic transmission 208 via fluid transfer between the torque converter turbine 286 and torque converter impeller 285, thereby enabling power multiplication. In contrast, when torque converter lock-up clutch 212 is fully engaged, the power from the engine crankshaft is directly transferred via the torque converter clutch to an input shaft 270 of transmission 208. Alternatively, the torque converter lock-up clutch 212 may be partially engaged, thereby enabling the amount of power directly relayed to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Transmission 208 also includes an electric transmission pump 283 that pressurizes fluid to operate the forward clutch 210 and gear clutches 211. Pump 283 may be selectively activated and deactivated via transmission controller 254 responsive to vehicle operating conditions. Automatic transmission 208 also includes gear clutches (e.g., gears 1-10) 211 and forward clutch 210. Automatic transmission 208 is a fixed step ratio transmission. The gear clutches 211 and the forward clutch 210 may be selectively engaged to change a ratio of an actual total number of turns of input shaft 270 to an actual total number of turns of wheels 216 via hydraulic pressure that may be supplied via electric transmission pump 283. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or torque request from an accelerator pedal or other device. Vehicle system controller 255 then requests engine torque or power via engine controller 12. If the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft torque and vehicle speed.

In response to a request to decelerate vehicle 225, vehicle system controller 255 may provide a negative desired wheel power (e.g., desired or requested powertrain wheel power) based on vehicle speed and brake pedal position. Vehicle system controller 255 then allocates a fraction of the negative desired wheel power to the engine 10. Vehicle system controller may also allocate a portion of the requested braking power to friction brakes 218 (e.g., desired friction brake wheel power). Further, vehicle system controller may notify transmission controller 254 that the vehicle is in braking mode so that transmission controller 254 shifts gears 211 based on a unique shifting schedule to increase engine braking efficiency. Engine 10 may supply a negative power to transmission input shaft 270, but negative power provided by engine 10 may be limited by transmission controller 254 which outputs a transmission input shaft negative power limit (e.g., not to be exceeded threshold value). Any portion of desired negative wheel power that may not be provided by engine 10 may be allocated to friction brakes 218 so that the desired wheel power is provided by a combination of negative power (e.g., power absorbed) via friction brakes 218 and engine 10.

Accordingly, power control of the various powertrain components may be supervised by vehicle system controller 255 with local power control for the engine 10, transmission 208, and brakes 218 that may be provided via engine controller 12, transmission controller 254, and brake controller 250. The vehicle system controller 255 may also receive vehicle position data (e.g., road grade, vehicle position, vehicle speed) from global positioning system 256. Inclinometer 257 may also indicate road grade to vehicle system controller 255.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), gear shift lever sensors, and ambient temperature sensors. Transmission controller 254 may also receive requested gear input from gear shift selector 290 (e.g., a human/machine interface device). Gear shift lever may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255.

Thus, the system of FIGS. 1 and 2 provides for a system, comprising: an engine; and a controller including executable instructions stored in non-transitory memory to inhibit automatic engine stopping of the engine in response to a battery state of charge being less than a threshold while vehicle speed is less than a rolling vehicle speed automatic engine stop threshold and above a steady-state vehicle speed automatic engine stop threshold after a most recent automatic engine stop at a vehicle speed between the rolling vehicle speed automatic engine stop threshold and the steady-state vehicle speed automatic engine stop threshold. The system further comprises additional instructions to cancel the inhibiting automatic engine stopping (e.g., allow automatic engine stopping) in response to vehicle speed exceeding the vehicle speed plus an offset speed. The system includes where inhibiting automatic engine stopping prevents automatic engine stopping, and where fuel injection to the engine continues when inhibiting automatic engine stopping. The system further comprises additional instructions to inhibit automatic engine stopping in response to releasing a brake pedal.

Figure 3:
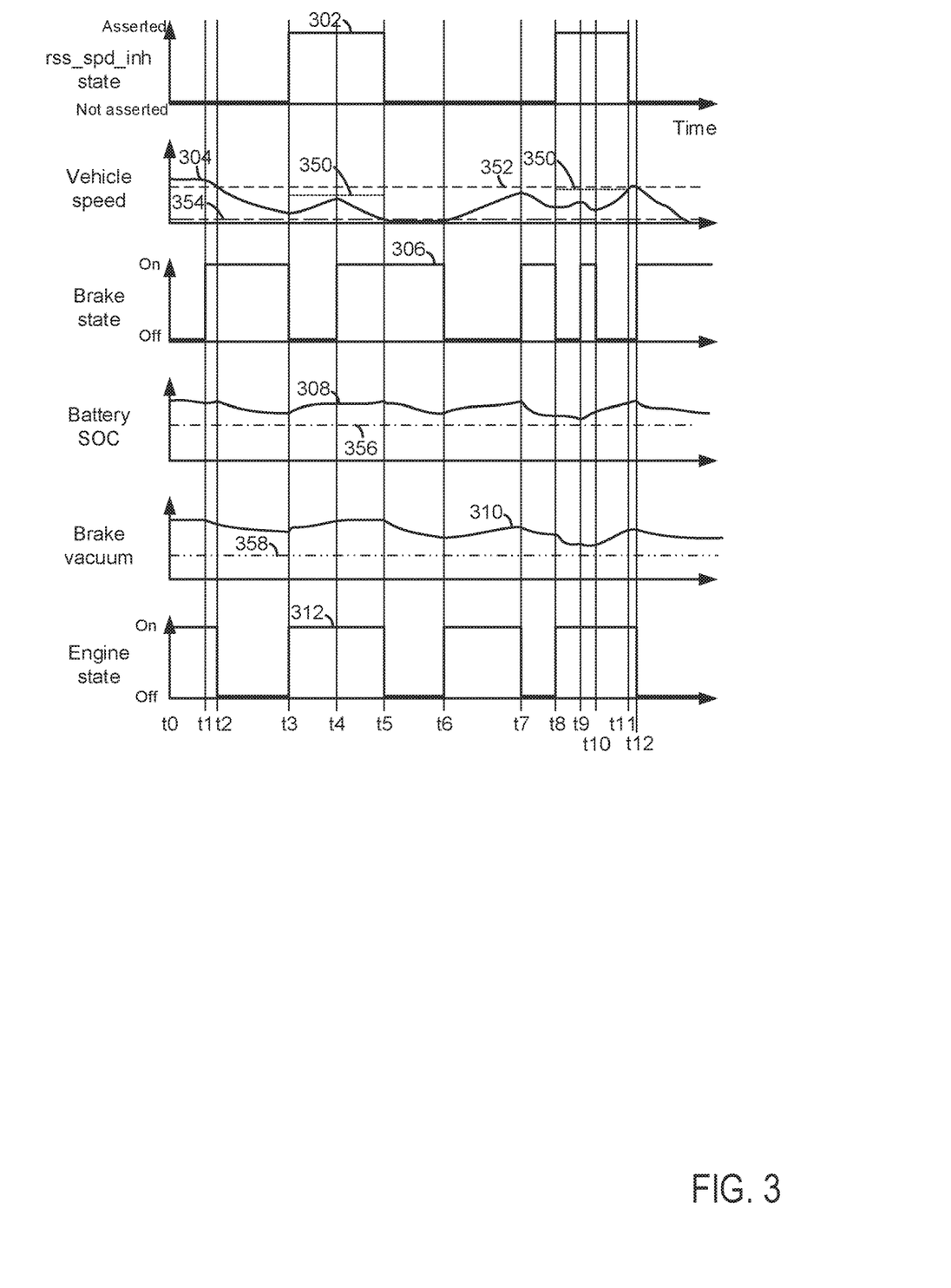
FIG. 3 shows a vehicle operating sequence.
Figure 4:
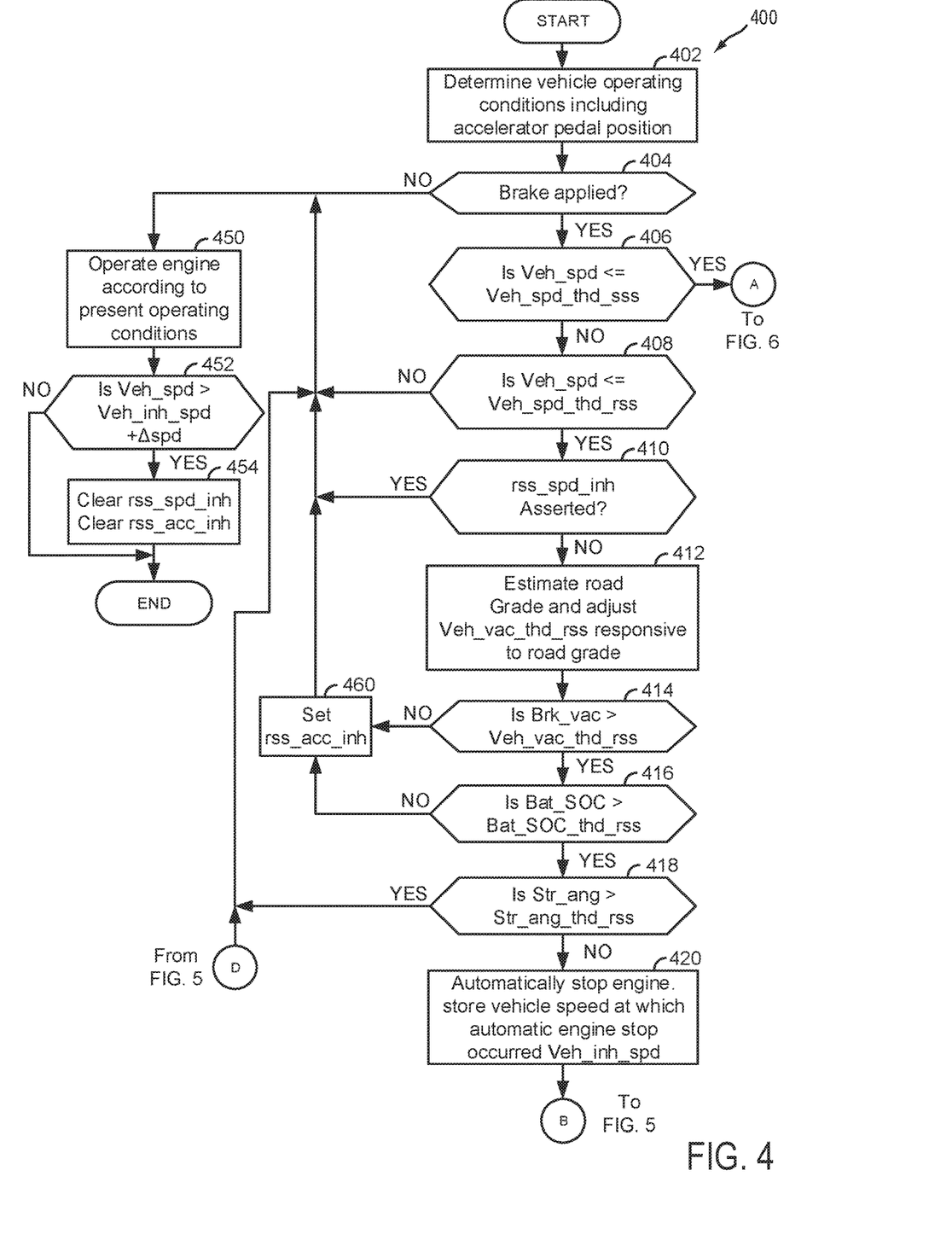
FIGS. 4-6 show a method for operating an engine.
Figure 5:
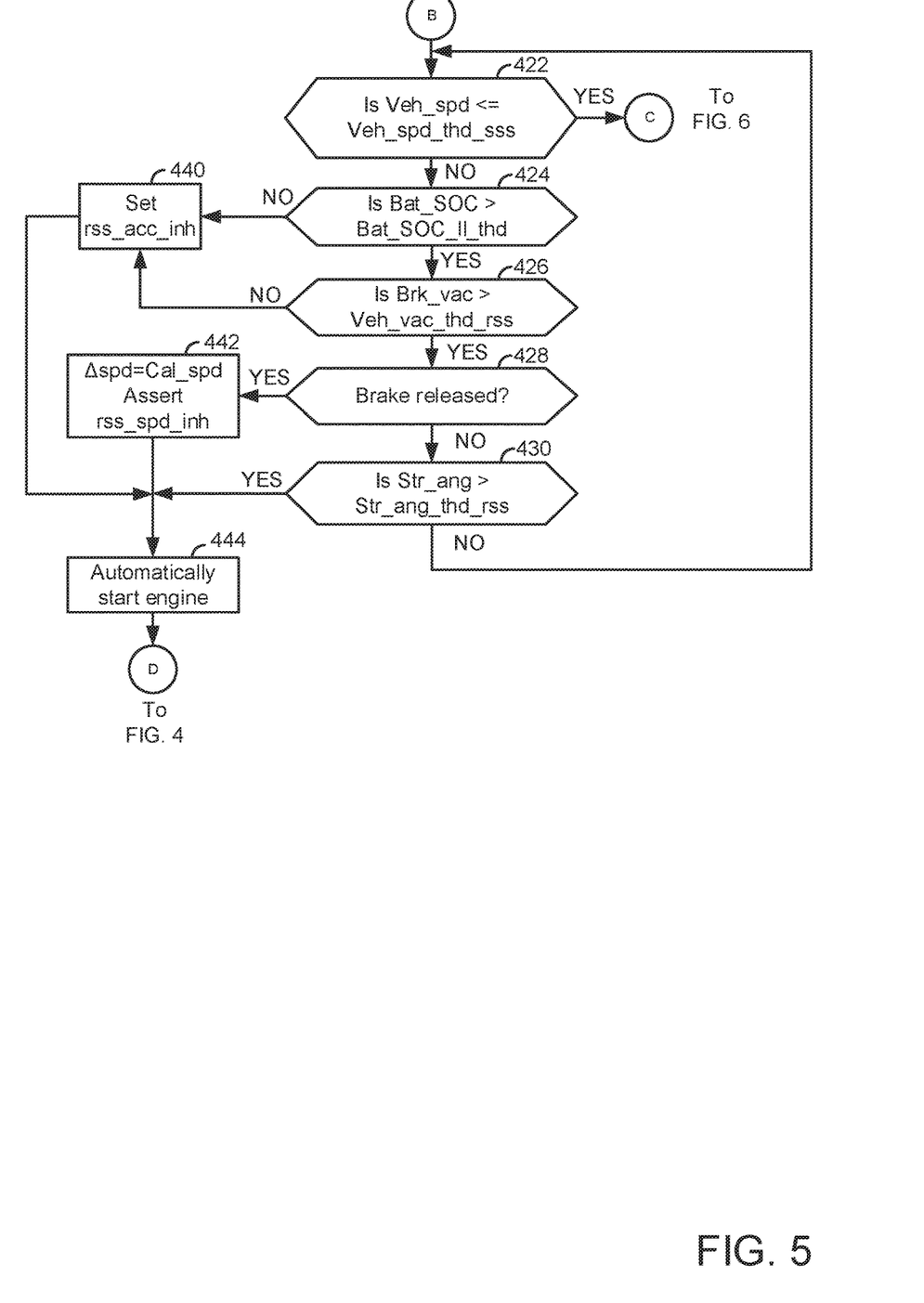
Figure 6:
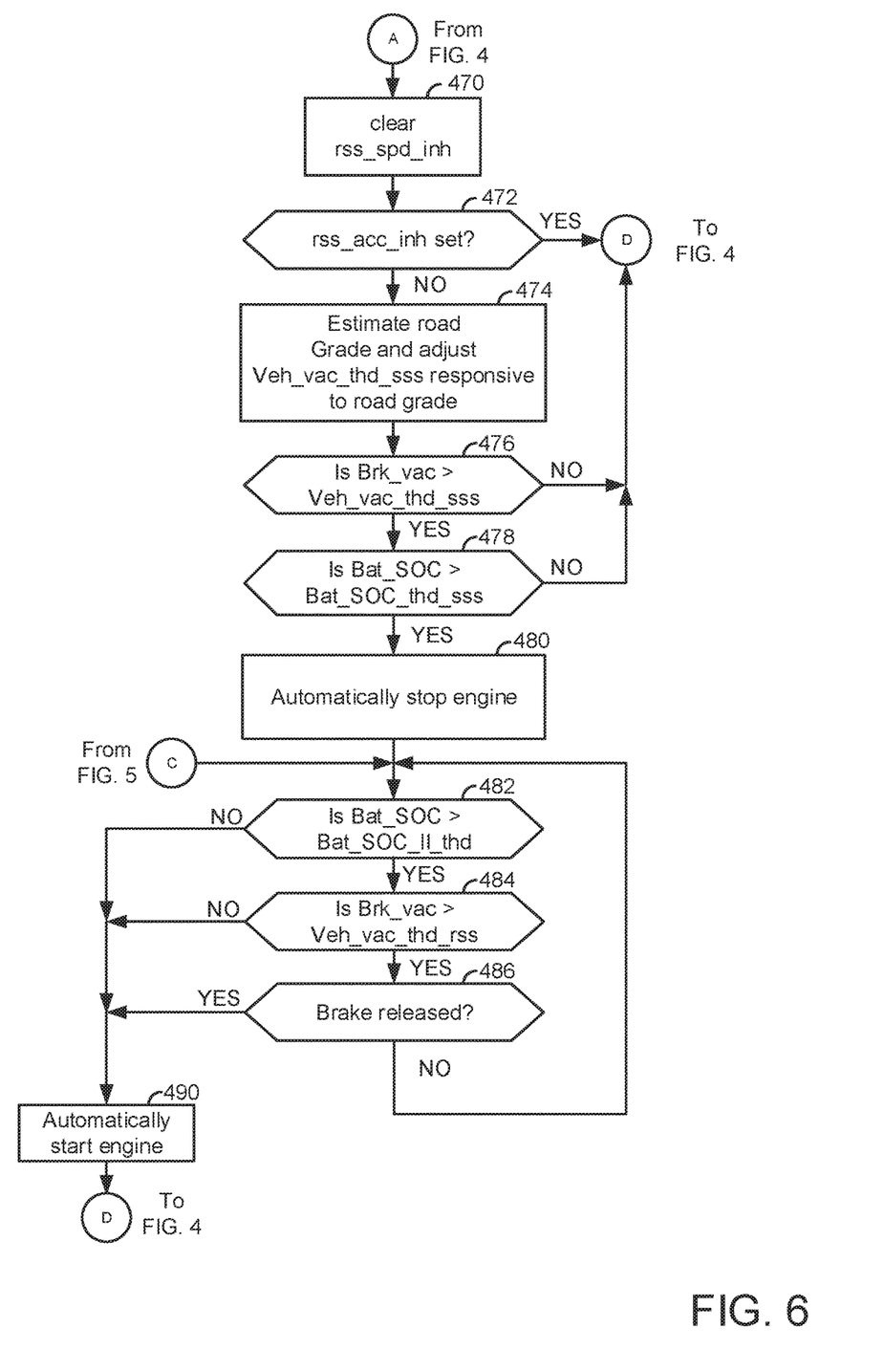

Referring now to FIG. 3, plots of a prophetic vehicle operating sequence according to the method of FIGS. 4-6 and the system of FIGS. 1 and 2 are shown. The plots are aligned in time and occur at a same time. The vertical lines at t0-t12 show particular times of interest.

The first plot from the top of FIG. 3 is a plot of a rolling vehicle stop/start inhibit (e.g., represented by variable or parameter rss_spd_inh) state versus time. Automatic engine stopping is inhibited when the rolling vehicle stop/start inhibit state is asserted (e.g., true or a logical value of one). Automatic engine stopping may not be inhibited when the rolling vehicle stop/start inhibit state is not asserted (e.g., false or a logical value of zero). The vertical axis represents the rolling vehicle stop/start inhibit state versus time. Trace 302 indicates the rolling vehicle stop/start inhibit state. Trace 302 indicates that the rolling vehicle stop/start inhibit state is asserted when trace 302 is at a higher level near the vertical axis arrow. Trace 302 indicates that the rolling vehicle stop/start inhibit state may not be asserted when trace 302 is at a lower level near the horizontal axis. The horizontal axis represents time and time increases from the left side of the plot to the right side of the plot.

The second plot from the top of FIG. 3 is a plot vehicle speed versus time. The vertical axis represents vehicle speed and the vehicle speed increases in the direction of the vertical axis arrow. Trace 304 represents vehicle speed. The horizontal axis represents time and the time increases from the left side of the figure to the right side of the figure. Line 350 represents a vehicle speed at which the engine was most recently automatically stopped plus an offset speed (e.g., Veh_inh_spd+Δspd). Line 352 represents a rolling vehicle engine stop/start threshold (e.g., Veh_spd_thd_rss) below which the engine may be automatically stopped. Line 354 represents a steady-state vehicle engine stop/start threshold (e.g., Veh_spd_thd_sss) at or below which the engine may be automatically stopped.

The third plot from the top of FIG. 3 is a plot of a vehicle brake state versus time. The vertical axis represents vehicle brake state. The vehicle brake is applied when trace 306 is at a higher level near the vertical axis arrow. The vehicle brake is not applied when trace 306 is at a lower level near the horizontal axis. The horizontal axis represents time and the time increases from the left side of the figure to the right side of the figure. Trace 306 represents the vehicle brake operating state.

The fourth plot from the top of FIG. 3 is a plot of battery state of charge (SOC) versus time. The vertical axis represents SOC and the SOC increases in the direction of the vertical axis arrow. The horizontal axis represents time and the time increases from the left side of the figure to the right side of the figure. Trace 308 represents the SOC. Horizontal line 356 represents a SOC level below which the engine may not be automatically stopped.

The fifth plot from the top of FIG. 3 is a plot of brake booster vacuum versus time. The vertical axis represents brake booster vacuum and the amount of vacuum increases in the direction of the vertical axis arrow. A higher vacuum indicates a lower pressure in the brake booster, which may provide greater braking assistance to a vehicle's driver. The horizontal axis represents time and the time increases from the left side of the figure to the right side of the figure. Trace 310 represents brake booster vacuum amount or level. Horizontal line 358 represents a vacuum level below which the engine may not be automatically stopped.

The sixth plot from the top of FIG. 3 is a plot of engine operating state versus time. The engine operating (e.g., combusting fuel) is activated and rotating when trace 312 is at a higher level near the vertical axis arrow. The engine is not activated and not rotating when trace 312 is at a level near the level of the horizontal axis. The horizontal axis represents time and the time increases from the left side of the figure to the right side of the figure. Trace 312 represents the engine operating state.

At time t0, the engine is running (e.g., combusting fuel and rotating) and automatic engine stopping is not inhibited or prevented. The vehicle speed is above a speed at which the engine may be automatically stopped and the brake is not applied. The SOC and vacuum levels are high.

At time t1, the engine remains running and the vehicle brake is applied. The engine is not automatically stopped because vehicle speed is greater than threshold 352. The vehicle speed begins to decline. The SOC and vacuum levels remain high. Automatic engine stopping is not inhibited or prevented.

At time t2, the vehicle speed falls below threshold 352 and the engine is stopped via the controller in response to the brake being applied, low driver demand torque (not shown), and vehicle speed being below threshold 352. Automatic engine stopping is not prevented and the brake still remains applied. The SOC and vacuum levels remain high.

Between time t2 and time t3, the vehicle speed continues to decline and the engine remains stopped (e.g., not combusting fuel and not rotating). Automatic engine stopping is not prevented or inhibited and the brake pedal is applied. The SOC and vacuum levels remain high.

At time t3, the vehicle driver (e.g., not shown) fully releases the brake pedal and applies the accelerator pedal (not shown). The engine is inhibited or prevented from being automatically stopped by asserting rss_spd_inh. The vehicle begins to accelerate and automatic engine stopping is prevented since the vehicle speed did not fall below threshold 354. The SOC and vacuum levels remain high. The engine is started in response to releasing the brake pedal. This procedure may prevent the engine from cycling between on and off states so that consumer satisfaction may be high. Further, the engine was allowed to be automatically stopped so that fuel may be conserved.

At time t4, the human or autonomous driver applies the vehicle brake and the vehicle speed is less than threshold 352, but the engine is not automatically stopped because vehicle speed did not exceed threshold 350 after the engine was automatically stopped the most recent time (e.g., at time t2). If vehicle speed had exceeded threshold 350, then the engine may have been allowed to automatically stop. The engine is inhibited or prevented from automatically stopping by rss_spd_inh being asserted. The SOC and vacuum levels remain high. The engine remains on and the vehicle begins to decelerate.

At time t5, the vehicle speed is reduced to a value that is less than threshold 354. Inhibiting of automatic engine stopping is cancelled in response to vehicle speed being less than threshold 354. The brake continues to be applied and the engine is automatically stopped in response to the brake being applied and the low vehicle speed. The SOC and vacuum levels remain high.

At time t6, the brake pedal is released by the driver and the engine is automatically started via the controller. The SOC and vacuum levels remain high. The vehicle begins to accelerate and automatic engine stopping is not inhibited.

At time t7, the vehicle speed is below threshold 352 and the engine is stopped via the controller in response to the brake being applied, low driver demand torque (not shown), and vehicle speed being below threshold 352. Automatic engine stopping is not prevented and the brake is applied. The SOC and vacuum levels remain high.

Between time t7 and time t8, the vehicle speed continues to decline and the engine remains stopped or off. Automatic engine stopping is not prevented or inhibited and the brake pedal is applied. The SOC and vacuum levels remain high.

At time t8, the vehicle driver (e.g., not shown) fully releases the brake pedal and applies the accelerator pedal (not shown). The engine is restarted in response to the brake pedal being released and the engine is inhibited or prevented from automatically stopping via asserting rss_spd_inh since the vehicle speed did not fall below threshold 354. The vehicle begins to accelerate. The SOC and vacuum levels remain high.

At time t9, the human or autonomous driver applies the vehicle brake and the vehicle speed is less than threshold 352, but the engine is not automatically stopped because vehicle speed did not exceed threshold 350 after the engine was automatically stopped the most recent time (e.g., at time t7). If vehicle speed had exceeded threshold 350, then the engine may have been allowed to automatically stop. The engine is inhibited or prevented from automatically stopping by rss_spd_inh being asserted. The SOC and vacuum levels remain high. The engine remains on and the vehicle begins to decelerate.

At time t10, the vehicle brake is released and the accelerator pedal is applied (not shown). The vehicle begins to accelerate and automatic engine stopping is still prevented. The SOC and vacuum levels remain high. The engine continues running (e.g., being on and combusting fuel).

At time t11, vehicle speed exceeds threshold 350 so inhibiting or preventing automatic engine stopping is cancelled. The engine is not automatically stopped because the brake is not applied and the vehicle speed continues to increase. The SOC and vacuum levels remain high. The engine remains on.

At time t12, the brake pedal is applied by the driver and the engine is automatically stopped via the controller since automatic engine stopping is not inhibited and since vehicle speed is less than threshold 352. The SOC and vacuum levels remain high. The vehicle is decelerating and automatic engine stopping is not inhibited.

Thus, a vehicle threshold (e.g., 350) at which inhibiting of automatic engine stopping is cleared may be dynamically adjusted so that an engine may not be automatically stopped and started so frequently as to disturb occupants of a vehicle. The inhibiting of automatic engine stopping may also be cleared if vehicle speed falls below a lower threshold level so that engine fuel consumption may be reduced.

Referring now to FIGS. 4-6, a flow chart of a method for operating a vehicle in a way that allows automatic engine stopping, but alters a frequency at which an engine may be automatically stopped is shown. The method of FIGS. 4-6 may be incorporated into and may cooperate with the system of FIGS. 1 and 2. Further, at least portions of the method of FIGS. 4-6 may be incorporated as executable instructions stored in non-transitory memory while other portions of the method may be performed via a controller transforming operating states of devices and actuators in the physical world.

At 402, method 400 determines vehicle operating conditions. Vehicle operating conditions may include but are not limited to vehicle speed, engine speed, engine temperature, electric energy storage device state of charge (SOC), brake pedal position, brake boost vacuum level, road grade, engine operating state, and accelerator pedal position. Method 400 proceeds to 404.

At 404, method 400 judges if a vehicle brake is applied. In one example, method 400 may judge that a vehicle brake is applied if a vehicle brake pedal is applied. If method 400 judges that a vehicle brake is applied, then the answer is yes and method 400 proceeds to 406. Otherwise, the answer is no and method 400 proceeds to 450.

At 450, method 400 operates the engine according to vehicle operating conditions. For example, method 400 may adjust the engine throttle and fuel injectors to provide a requested driver demand torque as determined from accelerator pedal position and vehicle speed. If the an engine stop is manually requested by the vehicle's driver, then the engine may be stopped. Method 400 proceeds to 452.

At 452, method 400 judges if present vehicle speed (Veh_spd) is greater than an automatic engine stop/start inhibit vehicle speed (Veh_inh_spd) plus an offset vehicle speed (Δspd). The automatic engine stop/start inhibit vehicle speed may be determined at 420 when the engine is automatically stopped. The offset vehicle speed may be a predetermined value that the present vehicle speed (Veh_spd) is greater than an automatic engine stop/start inhibit vehicle speed (Veh_inh_spd) plus an offset vehicle speed (Δspd), then the answer is yes and method 400 proceeds to 454. Otherwise, the answer is no and method 400 proceeds to exit.

At 454, method 400 clears or resets variables for inhibiting rolling vehicle engine stop/start based on vehicle speed (rss_spd_inh) and inhibiting rolling vehicle engine stop/start based on vehicle accessories (rss_acc_inh) to not asserted or false. Thus, if the vehicle speed is greater than the automatic engine stop/start inhibit vehicle speed plus the offset vehicle speed, then inhibiting or preventing rolling vehicle automatic engine stop/start is cancelled so that the engine may be automatically stopped to conserve fuel. Method 400 proceeds to exit.

At 406, method 400 judges whether or not the present vehicle speed is less than or equal to a steady-state vehicle speed threshold for engine stop/start (Veh_spd_thd_sss). The steady-state vehicle speed threshold for engine stop/start may be a lower threshold speed (e.g., 3 kilometers/hr). If method 400 judges that the present vehicle speed is less than or equal to a steady-state vehicle speed threshold for engine stop/start (Veh_spd_thd_sss), then the answer is yes and method 400 proceeds to 470. Otherwise, the answer is no and method 400 proceeds to 408.

At 408, method 400 judges whether or not the present vehicle speed is less than or equal to a rolling vehicle speed threshold for steady-state engine stop/start (Veh_spd_thd_rss). The rolling vehicle speed threshold for steady-state engine stop/start may be a higher threshold speed (e.g., 40 kilometers/hr). If method 400 judges that the present vehicle speed is less than or equal to a rolling vehicle speed threshold for engine stop/start (Veh_spd_thd_rss), then the answer is yes and method 400 proceeds to 410. Otherwise, the answer is no and method 400 proceeds to 450.

At 410, method 400 judges whether or not inhibiting of rolling vehicle engine stop/start based on vehicle speed is asserted. If so (e.g., rss_spd_inh=true), then the answer is yes and method 400 proceeds to 450. If not (e.g., rss_spd_inh=false), then the answer is no and method 400 proceeds to 412.

At 412, method 400 estimates a grade of a road that the vehicle is presently traveling on. In one example, method 400 may estimate the grade of the road from an inclinometer or a global positioning system. The inclinometer or global positioning system output a road grade estimate. Method 400 adjusts a brake booster or vacuum reservoir threshold for rolling vehicle engine automatic stop/start (Veh_vac_thd_rss) according to the road grade. In one example, the road grade is input to a table or function that includes empirically determined vacuum threshold levels and the table or function outputs a threshold vacuum level (Veh_vac_thd_rss) value based on the road grade. In one example, the function may be of the form shown in FIG. 8. The Method 400 proceeds to 414.

At 414, method 400 judges whether or not a present level of vacuum in a vacuum reservoir is greater than a threshold amount of vacuum Veh_vac_thd_rss. If so, then the answer is yes and method 400 proceeds to 416. If not, then the answer is no and method 400 proceeds to 460.

At 460, method 400 asserts the logical variable rss_acc_inh to true. By setting rss_acc_inh to true, rolling vehicle stop start is inhibited or prevented due to vehicle accessories, namely a lack of brake booster vacuum. Method 400 proceeds to 450.

At 416, method 400 judges whether or not a present level of battery state of charge (SOC) is greater than a threshold amount of battery SOC Veh_SOC_thd_rss. If so, then the answer is yes and method 400 proceeds to 418. If not, then the answer is no and method 400 proceeds to 460.

At 418, method 400 judges whether or not a present vehicle steering angle (Str_ang) is greater than a threshold steering angle Str_ang_thd_rss. If so, then the answer is yes and method 400 proceeds to 450. If not, then the answer is no and method 400 proceeds to 420.

At 420, method 400 automatically stops the engine. The engine may be automatically stopped by ceasing to supply spark and fuel to the engine. In addition, method 400 stores the present vehicle speed at which the engine is automatically stopped in variable Veh_inh_spd. For example, if the vehicle is traveling at 20 Kilometers/hr when the engine is stopped, then the value of 20 kilometers/hour is stored in the variable Veh_inh_spd. Method 400 proceeds to 422.

At 422, method 400 judges whether or not the present vehicle speed is less than or equal to a steady-state vehicle speed threshold for engine stop/start (Veh_spd_thd_sss). If method 400 judges that the present vehicle speed is less than or equal to a steady-state vehicle speed threshold for engine stop/start (Veh_spd_thd_sss), then the answer is yes and method 400 proceeds to 482. Otherwise, the answer is no and method 400 proceeds to 424.

At 424, method 400 judges whether or not a present level of battery state of charge (SOC) is greater than a threshold amount of battery SOC Veh_SOC_thd_rss. If so, then the answer is yes and method 400 proceeds to 426. If not, then the answer is no and method 400 proceeds to 440.

At 440, method 400 sets the logical variable rss_acc_inh to true. By setting rss_acc_inh to true, rolling vehicle stop start is inhibited or prevented due to vehicle accessories, namely a lack of brake booster vacuum or low battery SOC. Method 400 proceeds to 444.

At 426, method 400 judges whether or not a present level of vacuum in a vacuum reservoir is greater than a threshold amount of vacuum Veh_vac_thd_rss. If so, then the answer is yes and method 400 proceeds to 428. If not, then the answer is no and method 400 proceeds to 440.

At 428, method 400 judges whether or not the vehicle brake is released. In one example, method 400 may judge that the vehicle brake is released when a brake pedal is fully released. If method 400 judges that the vehicle brake is released, then the answer is yes and method 400 proceeds to 442. If not, then the answer is no and method 400 proceeds to 430.

At 442, method 400 asserts the variable rss_spd_inh to true to enable inhibiting of automatic engine stopping. By setting rss_spd_inh to true, the engine may not be automatically stopped while the vehicle is rolling above the speed of Veh_spd_thd_sss until the vehicle speed exceeds Veh_inh_spd+Δspd. Method 400 proceeds to 444.

At 430, method 400 judges whether or not a present vehicle steering angle (Str_ang) is greater than a threshold steering angle Str_ang_thd_rss. If so, then the answer is yes and method 400 proceeds to 444. If not, then the answer is no and method 400 returns to 422.

At 444, method 400 automatically starts the engine. The engine is automatically started via cranking the engine via a starter and supplying fuel and spark to the engine. Method 400 proceeds to 450.

At 470, method 400 clears or resets the variable rss_spd_inh to false or a logical level of zero so that the engine may be automatically stopped at low vehicle speeds when automatic engine stopping at higher vehicle speeds based on vehicle speed has been inhibited. Thus, by resetting the variable rss_spd_inh, the vehicle speed no longer has to exceed Veh_inh_spd+Δspd to enable automatic engine stopping at higher vehicle speeds. Method 400 proceeds to 472.

At 472, method 400 judges whether or not inhibiting of rolling vehicle engine stop/start based on vehicle accessories is asserted. If so (e.g., rss_acc_inh=true), then the answer is yes and method 400 proceeds to 450. If not (e.g., rss_spd_inh=false), then the answer is no and method 400 proceeds to 474.

At 474, method 400 estimates a grade of a road that the vehicle is presently traveling on. In one example, method 400 may estimate the grade of the road from an inclinometer or a global positioning system. The inclinometer or global positioning system output a road grade estimate. Method 400 adjusts a brake booster or vacuum reservoir threshold for steady-state vehicle engine automatic stop/start (Veh_vac_thd_sss) according to the road grade. In one example, the road grade is input to a table or function that includes empirically determined vacuum threshold levels and the table or function outputs a threshold vacuum level (Veh_vac_thd_sss) value based on the road grade. In one example, the function may be of the form shown in FIG. 8. The Method 400 proceeds to 476.

At 476, method 400 judges whether or not a present level of vacuum in a vacuum reservoir is greater than a threshold amount of vacuum Veh_vac_thd_sss. If so, then the answer is yes and method 400 proceeds to 478. If not, then the answer is no and method 400 proceeds to 450.

At 478, method 400 judges whether or not a present level of battery state of charge (SOC) is greater than a threshold amount of battery SOC Veh_SOC_thd_rss. If so, then the answer is yes and method 400 proceeds to 480. If not, then the answer is no and method 400 proceeds to 450.

At 480, method 400 automatically stops the engine. The engine may be automatically stopped by ceasing to supply spark and fuel to the engine. Method 400 proceeds to 482.

At 482, method 400 judges whether or not a present level of battery state of charge (SOC) is greater than a threshold amount of battery SOC Veh_SOC_thd_rss. If so, then the answer is yes and method 400 proceeds to 484. If not, then the answer is no and method 400 proceeds to 490.

At 484, method 400 judges whether or not a present level of vacuum in a vacuum reservoir is greater than a threshold amount of vacuum Veh_vac_thd_rss. If so, then the answer is yes and method 400 proceeds to 485. If not, then the answer is no and method 400 proceeds to 400.

At 486, method 400 judges whether or not the vehicle brake is released. In one example, method 400 may judge that the vehicle brake is released when a brake pedal is fully released. If method 400 judges that the vehicle brake is released, then the answer is yes and method 400 proceeds to 490. If not, then the answer is no and method 400 returns to 482.

At 490, method 400 automatically starts the engine. The engine is automatically started via cranking the engine via a starter and supplying fuel and spark to the engine. Method 400 proceeds to 450.

In this way, the automatic engine stopping may be temporarily inhibited and the inhibiting of automatic engine stopping may be cleared. A vehicle speed at which the inhibition of automatic engine stopping is cleared may be dynamically adjusted based on a vehicle speed at which the engine is automatically restarted so that engine stopping and starting busyness may be reduced.

Thus, the method of FIGS. 4-6 provides for an engine operating method, comprising: inhibiting automatic engine stopping of an engine via a controller in response to releasing a brake pedal while vehicle speed is less than a rolling vehicle speed automatic engine stop threshold and above a steady-state vehicle speed automatic engine stop threshold after a most recent automatic engine stop at a vehicle speed between the rolling vehicle speed automatic engine stop threshold and the steady-state vehicle speed automatic engine stop threshold. The method further comprises automatically starting the engine after the most recent automatic engine stop. The method includes where the most recent automatic engine stop is initiated via applying a brake pedal. The method further comprises inhibiting automatic engine stopping in response to battery state of charge being less than a threshold. The method further comprises inhibiting automatic engine stopping in response to a vacuum being less than a threshold. The method further comprises canceling the inhibiting automatic engine stopping in response to vehicle speed being less than the steady-state vehicle speed automatic engine stop threshold. The method further comprises preventing a canceling of the inhibiting automatic engine stopping in response to a battery state of charge being less than a threshold state of charge. The method further comprises preventing a canceling of the inhibiting automatic engine stopping in response to a vacuum being less than a threshold vacuum.

The method of FIGS. 4-6 also provides for an engine operating method, comprising:

inhibiting automatic engine stopping of an engine via a controller in response to releasing a brake pedal while vehicle speed is less than a rolling vehicle speed automatic engine stop threshold and above a steady-state vehicle speed automatic engine stop threshold after a most recent automatic engine stop at a vehicle speed between the rolling vehicle speed automatic engine stop threshold and the steady-state vehicle speed automatic engine stop threshold; and cancelling inhibiting automatic engine stopping in response to vehicle speed exceeding the vehicle speed between the rolling vehicle speed automatic engine stop threshold and the steady-state vehicle speed automatic engine stop threshold plus an offset speed. The method further comprises starting the engine a first time after the most recent automatic engine stop in response to battery state of charge being less than a threshold. The method further comprises starting the engine a first time after the most recent automatic engine stop in response to a vacuum being less than a threshold vacuum. The method further comprises starting the engine a first time after the most recent automatic engine stop in response to a steering angle being greater than a threshold angle. The method further comprises canceling the inhibiting automatic engine stopping in response to vehicle speed being less than the steady-state vehicle speed automatic stop threshold. The method includes where the brake pedal is fully released. The method further comprises canceling the inhibiting automatic engine stopping in response to vehicle speed being less than the steady-state vehicle speed automatic engine stop threshold. The method further comprises preventing the canceling the inhibiting automatic engine stopping in response to a battery state of charge being less than a threshold state of charge.

In another representation, the method of FIG. 4 provides for a vehicle operating method, comprising: adjusting an automatic engine stop/start vacuum threshold responsive to road grade; and inhibiting automatic engine stopping in response to the automatic engine stop/start vacuum threshold. The method further comprises automatic starting an engine in response to a steering angle greater than a threshold. The method further comprises inhibiting automatic engine stopping in response to a battery state of charge greater than a threshold. The method further comprises automatically starting an engine in response to battery state of charge less than a threshold.

Referring now to FIG. 7, a schematic representation showing steering angle is shown. Front vehicle wheels 710 are shown turned at an angle θ relative to a longitudinal axis 704 that is in parallel with the vehicle's longitudinal axis 702. The steering angle θ may be reported to vehicle controller 255 via steering angle sensor 706. The steering angle θ may be the basis for restarting engine 10 of FIG. 1. In addition, steering angle θ may be the basis for permitting automatic engine stopping.

Referring now to FIG. 8, a plot that shows a relationship between road grade and a brake vacuum threshold vacuum is shown. Curve 802 shows one non-limiting example of an empirically determined relationship between road grade and a brake vacuum threshold. The vertical axis represents the brake vacuum threshold and the brake vacuum threshold increases (e.g., requires additional vacuum) in the direction of the vertical axis arrow. The horizontal axis represents road grade and road grade increases in the direction of the horizontal axis arrow. It may be observed that the brake vacuum threshold increases as the road grade increases. This allows the vacuum reservoir to provide additional levels of brake assistance to a driver applying a brake when slowing a vehicle. At lower grades a lower vacuum level may be requested to permit automatic engine stopping since much less force may be needed to slow the vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. An engine operating method, comprising:
    inhibiting automatic engine stopping of an engine via a controller in response to releasing a brake pedal while vehicle speed is less than a rolling vehicle speed automatic engine stop threshold and above a steady-state vehicle speed automatic engine stop threshold after a most recent automatic engine stop at a vehicle speed between the rolling vehicle speed automatic engine stop threshold and the steady-state vehicle speed automatic engine stop threshold.

2. The method of claim 1, further comprising automatically starting the engine after the most recent automatic engine stop.

3. The method of claim 1, where the most recent automatic engine stop is initiated via applying a brake pedal.

4. The method of claim 1, further comprising inhibiting automatic engine stopping in response to battery state of charge being less than a threshold.

5. The method of claim 1, further comprising inhibiting automatic engine stopping in response to a vacuum being less than a threshold.

6. The method of claim 1, further comprising canceling the inhibiting automatic engine stopping in response to vehicle speed being less than the steady-state vehicle speed automatic engine stop threshold.

7. The method of claim 1, further comprising preventing a canceling of the inhibiting automatic engine stopping in response to a battery state of charge being less than a threshold state of charge.

8. The method of claim 1, further comprising preventing a canceling of the inhibiting automatic engine stopping in response to a vacuum being less than a threshold vacuum.

9. An engine operating method, comprising:
  inhibiting automatic engine stopping of an engine via a controller in response to releasing a brake pedal while vehicle speed is less than a rolling vehicle speed automatic engine stop threshold and above a steady-state vehicle speed automatic engine stop threshold after a most recent automatic engine stop at a vehicle speed between the rolling vehicle speed automatic engine stop threshold and the steady-state vehicle speed automatic engine stop threshold; and
  cancelling inhibiting automatic engine stopping in response to vehicle speed exceeding the vehicle speed between the rolling vehicle speed automatic engine stop threshold and the steady-state vehicle speed automatic engine stop threshold plus an offset speed.

10. The method of claim 9, further comprising starting the engine a first time after the most recent automatic engine stop in response to battery state of charge being less than a threshold.

11. The method of claim 10, further comprising starting the engine a first time after the most recent automatic engine stop in response to a vacuum being less than a threshold vacuum.

12. The method of claim 11, further comprising starting the engine a first time after the most recent automatic engine stop in response to a steering angle being greater than a threshold angle.

13. The method of claim 12, further comprising canceling the inhibiting automatic engine stopping in response to vehicle speed being less than the steady-state vehicle speed automatic stop threshold.

14. The method of claim 9, where the brake pedal is fully released.

15. The method of claim 9, further comprising canceling the inhibiting automatic engine stopping in response to vehicle speed being less than the steady-state vehicle speed automatic engine stop threshold.

16. The method of claim 15, further comprising preventing the canceling the inhibiting automatic engine stopping in response to a battery state of charge being less than a threshold state of charge.

17. A system, comprising:
  an engine; and
  a controller including executable instructions stored in non-transitory memory to inhibiting automatic engine stopping of the engine in response to a battery state of charge being less than a threshold while vehicle speed is less than a rolling vehicle speed automatic engine stop threshold and above a steady-state vehicle speed automatic engine stop threshold after a most recent automatic engine stop at a vehicle speed between the rolling vehicle speed automatic engine stop threshold and the steady-state vehicle speed automatic engine stop threshold.

18. The system of claim 16, further comprising additional instructions to cancel the inhibiting automatic engine stopping in response to vehicle speed exceeding the vehicle speed plus an offset speed.

19. The system of claim 17, where inhibiting automatic engine stopping prevents automatic engine stopping, and where fuel injection to the engine continues when inhibiting automatic engine stopping.

20. The system of claim 16, further comprising additional instructions to inhibit automatic engine stopping in response to releasing a brake pedal.

\* \* \* \* \*